(12) United States Patent
Wang et al.

(10) Patent No.: US 9,411,620 B2
(45) Date of Patent: Aug. 9, 2016

(54) VIRTUAL STORAGE MIGRATION METHOD, VIRTUAL STORAGE MIGRATION SYSTEM AND VIRTUAL MACHINE MONITOR

(75) Inventors: Zhikun Wang, Shenzhen (CN); Xiaowei Yang, Shenzhen (CN); Feng Wang, Shenzhen (CN); Jianhui Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 825 days.

(21) Appl. No.: 13/340,117

(22) Filed: Dec. 29, 2011

(65) Prior Publication Data

US 2012/0137098 A1 May 31, 2012

Related U.S. Application Data

(63) Continuation of application No. PCT/CN2011/074189, filed on May 17, 2011.

(30) Foreign Application Priority Data

Nov. 29, 2010 (CN) .......................... 2010 1 0578913

(51) Int. Cl.
*G06F 12/02* (2006.01)
*G06F 9/455* (2006.01)
*G06F 3/06* (2006.01)

(52) U.S. Cl.
CPC .......... *G06F 9/45533* (2013.01); *G06F 3/0617* (2013.01); *G06F 3/0647* (2013.01); *G06F 3/0683* (2013.01); *G06F 2009/4557* (2013.01); *G06F 2009/45579* (2013.01)

(58) Field of Classification Search
None
See application file for complete search history.

(56) References Cited

U.S. PATENT DOCUMENTS 8,341,459 B2 * 12/2012 Kaushik ................ G06F 3/0617
709/232
2004/0044698 A1 * 3/2004 Ebata et al. .................... 707/200
(Continued)

FOREIGN PATENT DOCUMENTS

| CN | 1934568 A | 3/2007 |
|---|---|---|
| CN | 101105738 A | 1/2008 |

(Continued)

OTHER PUBLICATIONS

Written Opinion of the International Searching Authority in corresponding PCT Patent Application No. PCT/CN2011/074189 (Aug. 18, 2011).

(Continued)

*Primary Examiner* — Charles Rones
*Assistant Examiner* — Ryan Dare
(74) *Attorney, Agent, or Firm* — Leydig, Voit & Mayer, Ltd.

(57) ABSTRACT

A virtual storage migration method is provided, including: starting a data migration process, and copying, from a source storage device to a destination storage device, a data block in a virtual disk to be migrated; when a VM front-end I/O read request is received, directly reading, corresponding data from the source storage device; when a VM front-end I/O write request is received, determining whether a migration data block that corresponds to the write request is being migrated, if yes, executing a write operation that corresponds to the write request after the migration of the migration data block is completed, if no, executing a write operation that corresponds to the write request; and after all the data blocks in the virtual disk to be migrated are copied to the destination storage device, stopping the data migration, and switching the virtual disk from the source storage device to the destination storage device.

17 Claims, 6 Drawing Sheets

(56) References Cited

U.S. PATENT DOCUMENTS

| | | | |
|---|---|---|---|
| 2005/0278492 A1 | 12/2005 | Stakutis et al. | |
| 2006/0136691 A1* | 6/2006 | Brown et al. | 711/165 |
| 2008/0016390 A1 | 1/2008 | Cannon et al. | |
| 2009/0037679 A1 | 2/2009 | Kaushik et al. | |
| 2010/0082922 A1* | 4/2010 | George et al. | 711/162 |
| 2010/0131728 A1 | 5/2010 | Miyamae et al. | |
| 2010/0205479 A1* | 8/2010 | Akutsu et al. | 714/3 |
| 2011/0040943 A1* | 2/2011 | Kondo et al. | 711/162 |
| 2012/0066677 A1* | 3/2012 | Tang | 718/1 |

FOREIGN PATENT DOCUMENTS

| | | |
|---|---|---|
| CN | 101464812 A | 6/2009 |
| CN | 102073462 A | 5/2011 |
| JP | 2007042115 A | 2/2007 |
| JP | 2008021252 A | 1/2008 |
| JP | 2008524724 A | 7/2008 |
| JP | 2010039685 A | 2/2010 |
| JP | 2010237737 A | 10/2010 |
| JP | 2010257209 A | 11/2010 |
| JP | 2011221945 A | 11/2011 |
| WO | WO 2006069178 A2 | 6/2006 |
| WO | WO 2012063334 A1 | 5/2012 |

OTHER PUBLICATIONS

1$^{st}$ Office Action in corresponding Chinese Patent Application No. 201010578913.3 (Jan. 18, 2012).
2$^{nd}$ Office Action in corresponding Chinese Patent Application No. 201010578913.3 (Oct. 23, 2012).
International Search Report in corresponding PCT Application No. PCT/CN2011/074189 (Aug. 18, 2011).
Extended European Search Report in corresponding European Patent Application No. 11777199.8 (May 15, 2012).
1$^{st}$ Office Action in corresponding Japanese Patent Application No. 2012-545079 (Aug. 6, 2013).

* cited by examiner

VIRTUAL STORAGE MIGRATION METHOD, VIRTUAL STORAGE MIGRATION SYSTEM AND VIRTUAL MACHINE MONITOR

CROSS-REFERENCE TO RELATED APPLICATIONS

This application is a continuation of International Application No. PCT/CN2011/074189, filed on May 17, 2011, which claims priority to Chinese Patent Application No. 201010578913.3, filed on Nov. 29, 2010, both of which are hereby incorporated by reference in their entireties.

FIELD OF THE INVENTION

The present invention relates to communications technologies, and in particular to a virtual storage migration method, a virtual storage migration system and a virtual machine monitor.

BACKGROUND OF THE INVENTION

The virtualization technology is a decoupling method for separating lower layer hardware devices from an upper layer operating system (OS) and applications. As one of important technologies supporting a lower layer of the currently popular cloud computing platform, the virtualization technology may significantly improve the resource utilization efficiency of a physical device. Compared with a conventional physical machine, a virtual machine (VM) has better isolation and encapsulation, and may save information of the whole VM into a virtual disk image (VDI) file, so as to facilitate snapshots and backups of the VM. A virtual disk (VD) is a virtual storage device provided by a virtual machine monitor (VMM) for the VM to use. A physical storage space that corresponds to the VD may be a local storage system of a host, and may also be a network storage system in a data center. When a physical storage space connected to the host is insufficient or a storage device is added to or deleted from a storage system, the VD needs to be rearranged and reallocated, that is, virtual storage migration is performed, so as to perform load balancing on the storage resource in the data center. Virtual storage migration may include an offline migration method and an online migration method, in which the virtual storage online migration method may be used without interrupting a front-end application of the VM.

In the prior art, the virtual storage online migration method mainly includes a memory online migration pre-copy method and a storage online migration post-copy method. In the first method, a read-only parent disk and a child disk for recording changed data are generated by establishing VD snapshots. After the data of the parent disk has been copied, the VM needs to be suspended, and the child disk for recording the changed data and the parent disk in a destination storage device are combined. In the second method, by combining the pre-copy and cyclic iteration copy, all storage data is first sent to a destination host, storage update blocks are recorded and labeled in said sending process, and the storage update blocks are cyclically sent to the destination host. The cyclic sending step is repeated till a preset condition is met, and the VM is then suspended, and the rest storage update blocks are copied and synchronized.

However, in the first method in the prior art, the VM needs to be suspended during combination of the child disk for recording the changed data and the parent disk in the destination storage device. When a combined data volume is large or a network state is poor, the suspension of the VM may result in service interruption or even an error. Although the second method in the prior art may reduce suspension time of the VM to a certain extent, when too many write requests of the VM exist in the migration process, more data copy and cyclic iterations are triggered. When access of the read request of the VM is missing, it is needed to wait corresponding data to be copied from a source storage device to the destination storage device, as a result, a large delay of read response is caused, and storage migration time is prolonged, and therefore normal input/output (I/O) access performance of the VM is affected.

SUMMARY OF THE INVENTION

The embodiments of the present invention provide a virtual storage migration method, a virtual storage migration system, and a VMM, which are used to avoid the disadvantages in the prior art that service interruption or even an error occurs due to suspension of a VM and the access performance of the VM is reduced due to excessively long storage migration time, so an I/O access request of the VM may be processed simultaneously during the migration process of a Virtual disk, and the whole migration process requires no suspension of the VM, and thereby storage migration time is greatly reduced.

An embodiment of the present invention provides a virtual storage migration method, where the method includes:
   starting data migration, and copying, from a source storage device to a destination storage device, data blocks in a Virtual disk to be migrated;
   during the data migration process, when a VM front-end I/O read request is received, directly reading, from the source storage device, data that corresponds to the VM front-end I/O read request; and when a VM front-end I/O write request is received, determining whether a migration data block that corresponds to the VM front-end I/O write request is being migrated, and if the migration data block that corresponds to the VM front-end I/O write request is being migrated, executing a write operation that corresponds to the VM front-end I/O write request after the migration of the migration data block is completed; if the migration data block that corresponds to the VM front-end I/O write request is not being migrated, executing the write operation that corresponds to the VM front-end I/O write request; and
   after all data blocks in the Virtual disk to be migrated are copied to the destination storage device, stopping the data migration, and switching the Virtual disk managed by a VM manager from the source storage device to the destination storage device.

An embodiment of the present invention further provides a VMM, where the VMM includes:
   a migration module, configured to start data migration, and copy, from a source storage device to a destination storage device, data blocks in a Virtual disk to be migrated;
   a request processing module, configured to, during the data migration process, directly read, from the source storage device, data that corresponds to a VM front-end I/O read request when the VM front-end I/O read request is received; and determine whether a migration data block that corresponds to the VM front-end I/O write request is being migrated when a VM front-end I/O write request is received, and if the migration data block that corresponds to the VM front-end I/O write request is being migrated, execute a write operation that corresponds to the VM front-end I/O write request after the migration of the migration data block is completed; if the migration data block that corresponds to the VM front-end I/O write request is not being migrated, execute the write operation that corresponds to the VM front-end I/O write request; and a switch module, configured to stop the data migration after all data blocks in the Virtual disk to be migrated are copied to the destination storage device, and switch the Virtual disk managed by a VM manager from the source storage device to the destination storage device.

An embodiment of the present invention provides a virtual storage migration system, where the virtual storage migration system includes at least one VM, a source storage device, a destination storage device and the VMM.

In the virtual storage migration method, the virtual storage migration system and the VMM according to the embodiments of the present invention, the VMM starts a data migration thread, the data blocks in the Virtual disk to be migrated are copied from the source storage device to the destination storage device. During the data migration process, corresponding processing is performed on a received VM front-end I/O access request according to the current data migration situation, that is, when a VM front-end I/O read request is received, data that corresponds to the VM front-end I/O read request is directly read, and when a VM front-end I/O write request is received, it is first determined whether a migration data block that corresponds to the VM front-end I/O write request is being migrated. If the migration data block that corresponds to the VM front-end I/O write request is being migrated, the write operation is executed after the migration is completed. If the migration data block that corresponds to the VM front-end I/O write request is not being migrated, the write operation is directly executed. After the Virtual disk is migrated from the source storage device to the destination storage device, the storage device which is used by the VM is switched from the source storage device to the destination storage device. Therefore, the whole process is transparent to the upper layer OS and applications running within the VM. Moreover, as the VM front-end I/O access request is processed simultaneously during the data migration process, no additional child disk is required to record data changed in each request, and no VM suspension is required to separately perform update processing on the changed data. Therefore, in this embodiment, service interruption or even an error caused by VM suspension is avoided. Furthermore, compared with the storage online migration post-copy method in the prior art, as no cyclic iteration copy is required for the changed part of the data blocks, a migration data volume is greatly reduced, and migration time is shortened, and thereby the access performance of the VM is improved.

BRIEF DESCRIPTION OF THE DRAWINGS

To illustrate the technical solutions according to the embodiments of the present invention or in the prior art more clearly, the accompanying drawings required for describing the embodiments or the prior art are briefly introduced below. Apparently, the accompanying drawings in the following descriptions show some of the embodiments of the present invention, and persons skilled in the art may obtain other drawings according to the accompanying drawings without creative efforts.

DETAILED DESCRIPTION OF THE EMBODIMENTS

In order to make the objectives, the technical solutions and advantages of the embodiments of the present invention more clearly, the technical solutions in the embodiments of the present invention are clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative effects shall fall within the protection scope of the present invention.

Figure 1:
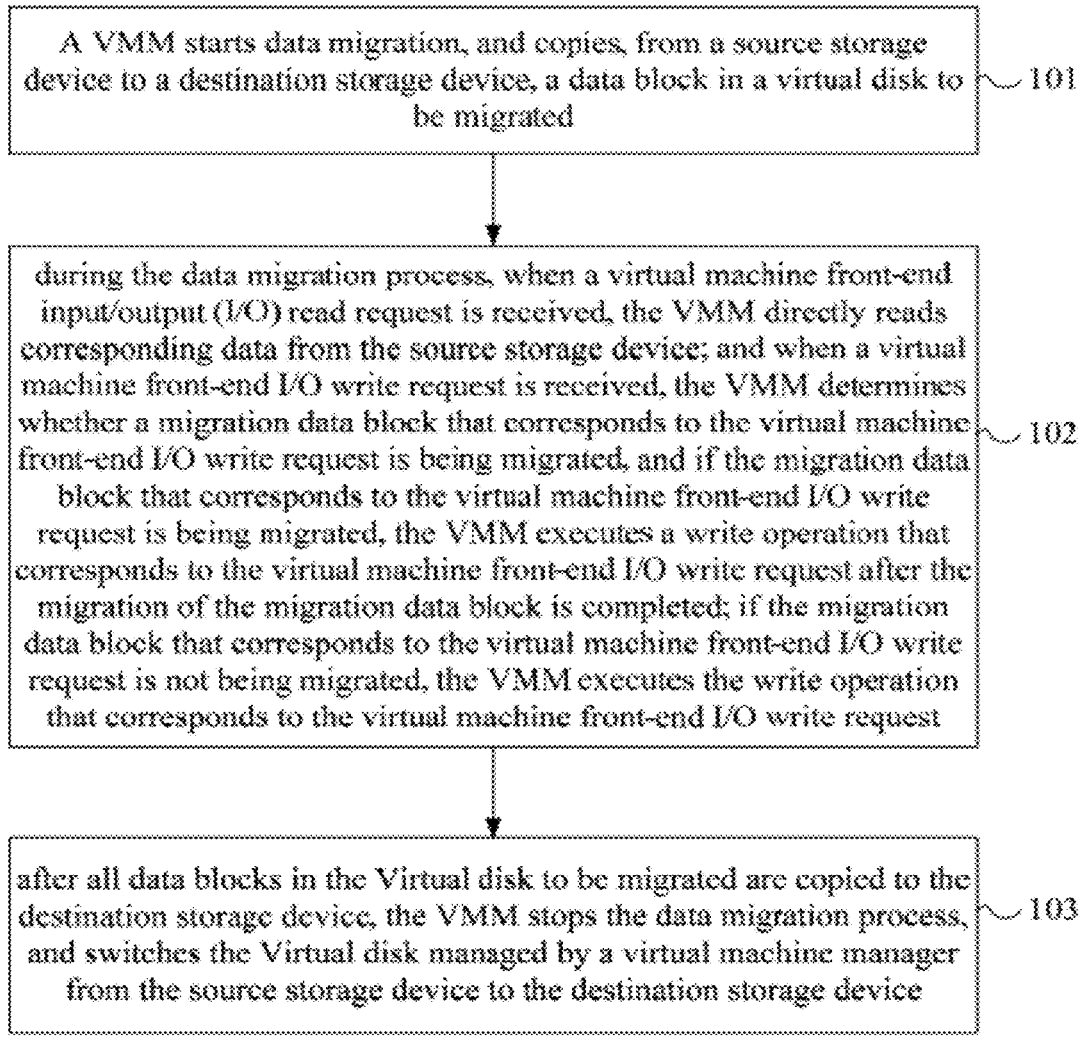
FIG. 1 is a flow chart of a virtual storage migration method according to Embodiment 1 of the present invention.

FIG. 1 is a flow chart of a virtual storage migration method according to Embodiment 1 of the present invention. As shown in FIG. 1, this embodiment provides a virtual storage migration method, where the method includes the following steps:

Step 101: A VMM starts data migration, and copies, from a source storage device to a destination storage device, data blocks in a Virtual disk to be migrated.

Figure 2:
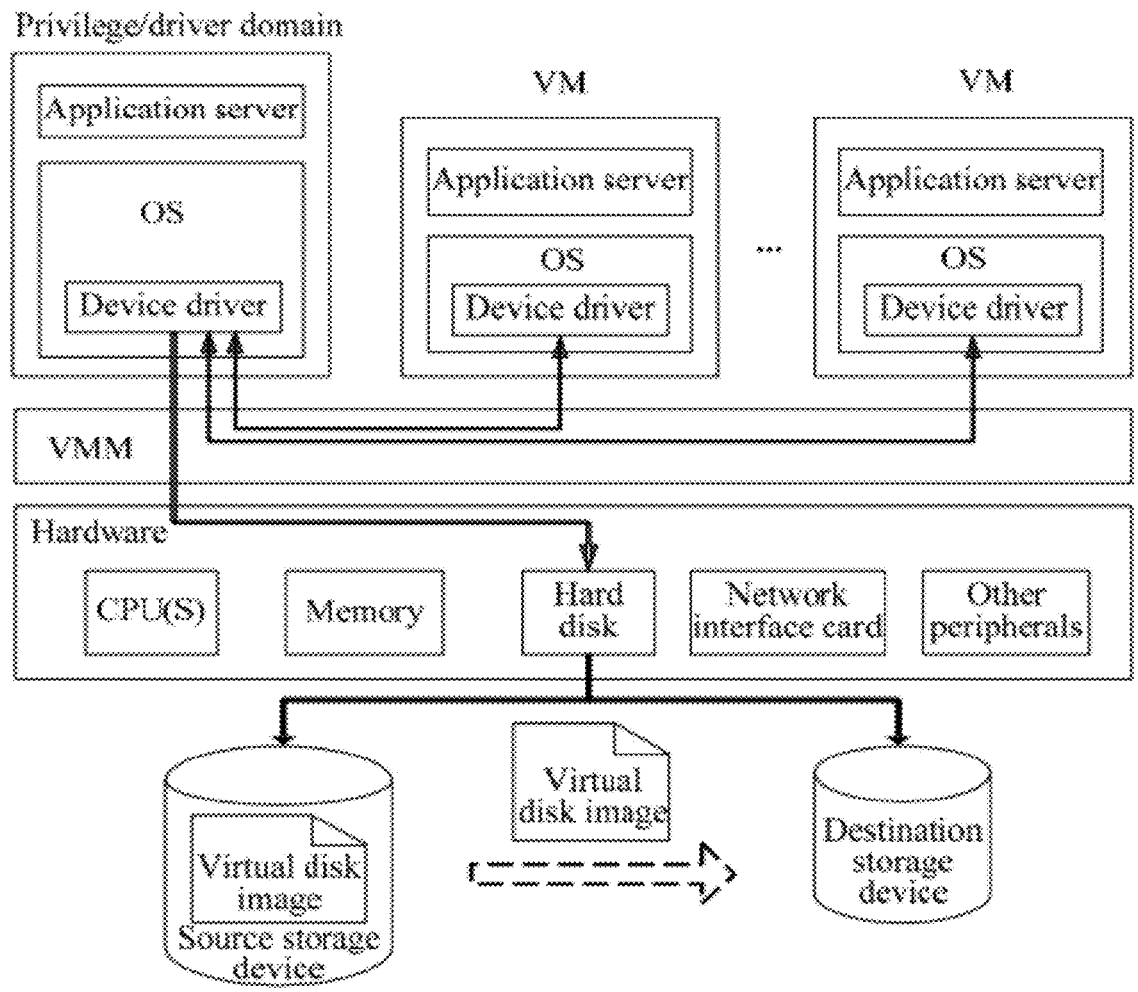
FIG. 2 is a schematic diagram of a network architecture in the virtual storage migration method according to Embodiment 1 of the present invention.

FIG. 2 is a schematic diagram of a network architecture in the virtual storage migration method according to Embodiment 1 of the present invention. As shown in FIG. 2, a VMM is a management layer between an OS and hardware, which may directly manage lower layer hardware resources including central processing unit (CPU)s, a memory and a disk establish VM(s) which is independent to a lower layer hardware, where an upper layer OS and applications is running within the VM(s), and monitor all I/O access requests of the VM(s). It may be seen from FIG. 2 that a network may include multiple VMs, in which one VM (that is, a first VM leftmost in FIG. 2) is a VM in a privilege/driver domain and is configured to assist the VMM to complete the I/O function, and the OS and applications running within other VMs complete the access to the lower layer storage system through a native device driver in the VM in the privilege/driver domain. That is, the other VMs may forward the I/O access requests of the other VMs to the VM in the privilege/driver domain, and then the VM in the privilege/driver domain performs data exchange with the VMM, so as to implement the access on a physical disk responsive to the I/O access request. In the embodiment of the present invention, the VMM starts a data migration process to implement the virtual storage migration, and during execution of the data migration process, the VMM copies, from the source storage device to the destination storage device, data blocks in the Virtual disk to be migrated. Specifically, the virtual storage migration process in this step may be completed by starting a storage migration thread, and the processes in the subsequent embodiments are similar to this process and are no longer described again.

Step 102: During the data migration process, when a VM front-end I/O read request is received, the VMM directly reads data that corresponds to the VM front-end I/O read request; when a VM front-end I/O write request is received, the VMM determines whether a migration data block that corresponds to the VM front-end I/O write request is being migrated, and if the migration data block that corresponds to the VM front-end I/O write request is being migrated, the VMM executes a write operation that corresponds to the VM front-end I/O write request after the migration of the migration data block is completed; and if the migration data block that corresponds to the VM front-end I/O write request is not being migrated, the VMM executes the write operation that corresponds to the VM front-end I/O write request.

In the process that the VMM starts the data migration process to perform data migration, the VMM further receives the VM front-end I/O access request sent by the VM simultaneously, and processes the received VM front-end I/O access request according to current data migration situation, that is, an I/O request redirection process is integrated in the data migration for execution. When the VM front-end I/O access request accesses the Virtual disk, the I/O access request and a corresponding request during the data migration are arranged in a request queue, and the VMM obtains different requests from the request queue in real time according to a certain policy during the data migration process and performs corresponding processing on different requests, that is, sets different processing priorities for different I/O requests in the queue according to an actual situation. Compared with the first method in the prior art that an additional child disk space is required to record changed data in the migration process and the VM is suspended after the data migration to perform corresponding processing on the changed data, as the VM front-end I/O access request is processed simultaneously when the data migration is performed in this embodiment, that is, the data migration process and the processing process of the VM front-end I/O access request are independent to each other, and do not affect each other. Therefore, the whole data migration process is transparent to the VM and the applications running within the VM.

Specifically, in this step, during the data migration process, the VMM receives the VM front-end I/O access request sent by the VM. When the VM front-end I/O access request is a read request, the VMM does not need to determine whether the data block that corresponds to the read request has been migrated or is being migrated, the VMM directly reads the data that corresponds to the read request from the source storage device according to the read request, and the procedure is ended. At this time, the execution of the read request and the data migration process are synchronous, and do not affect each other. When the VM front-end I/O access request is a write request, the VMM needs to determine whether the migration data block that corresponds to the write request is being migrated, that is, determine whether the migration data block in the Virtual disk to be migrated which is required by the write request and is to be written into the Virtual disk is being migrated. When the migration data block that corresponds to the write request received by the VMM is being migrated, the VMM does not execute the write operation that corresponds to the write request, but executes the corresponding write operation after the migration of the migration data block is completed. When the migration data block that corresponds to the write request received by the VMM is not being migrated, the VMM directly execute the write operation that corresponds to the write request without waiting the migration of the migration data block to be completed.

Step 103: After all data blocks in the Virtual disk to be migrated are copied to the destination storage device, the VMM stops the data migration, and switches the Virtual disk managed by a VM manager from the source storage device to the destination storage device.

After all the data blocks in the Virtual disk to be migrated are copied from the source storage device to the destination storage device, that is, after the whole data migration process is completed, the VMM stops the data migration process that is started previously, and switches the Virtual disk managed by the VM manager from the previously set source storage device to the destination storage device.

This embodiment provides a virtual storage migration method, in which the VMM starts a data migration process, the data blocks in the Virtual disk to be migrated are copied from the source storage device to the destination storage device; during the data migration process, and corresponding processing is performed on the received VM front-end I/O access request according to the current data migration situation. That is, when a VM front-end I/O read request is received, data that corresponds to the VM front-end I/O read request is directly read, and when a VM front-end I/O write request is received, it is first determined whether a migration data block that corresponds to the write request is being migrated. If the migration data block that corresponds to the VM front-end I/O write request is being migrated, the VMM executes the write operation after the migration to be completed. If the migration data block that corresponds to the VM front-end I/O write request is not being migrated, the VMM directly executes the write operation. After the Virtual disk is copied from the source storage device to the destination storage device, the Storage device which is used by the VM is switched from the source storage device to the destination storage device. Therefore, the whole process is transparent to the upper layer OS and applications running within the VM. Moreover, as the VM front-end I/O access request is processed simultaneously during the data migration, no additional child disk is required to record data changed in each request, and no VM suspension is required to separately perform update processing on the changed data. Therefore, in this embodiment, service interruption or even an error caused by VM suspension is avoided. Furthermore, compared with the storage online migration post-copy method in the prior art, as no cyclic iteration copy is required for the changed part of the data blocks, a migration data volume is greatly reduced, and migration time is shortened, and thereby the access performance of the VM is improved.

Figure 3:
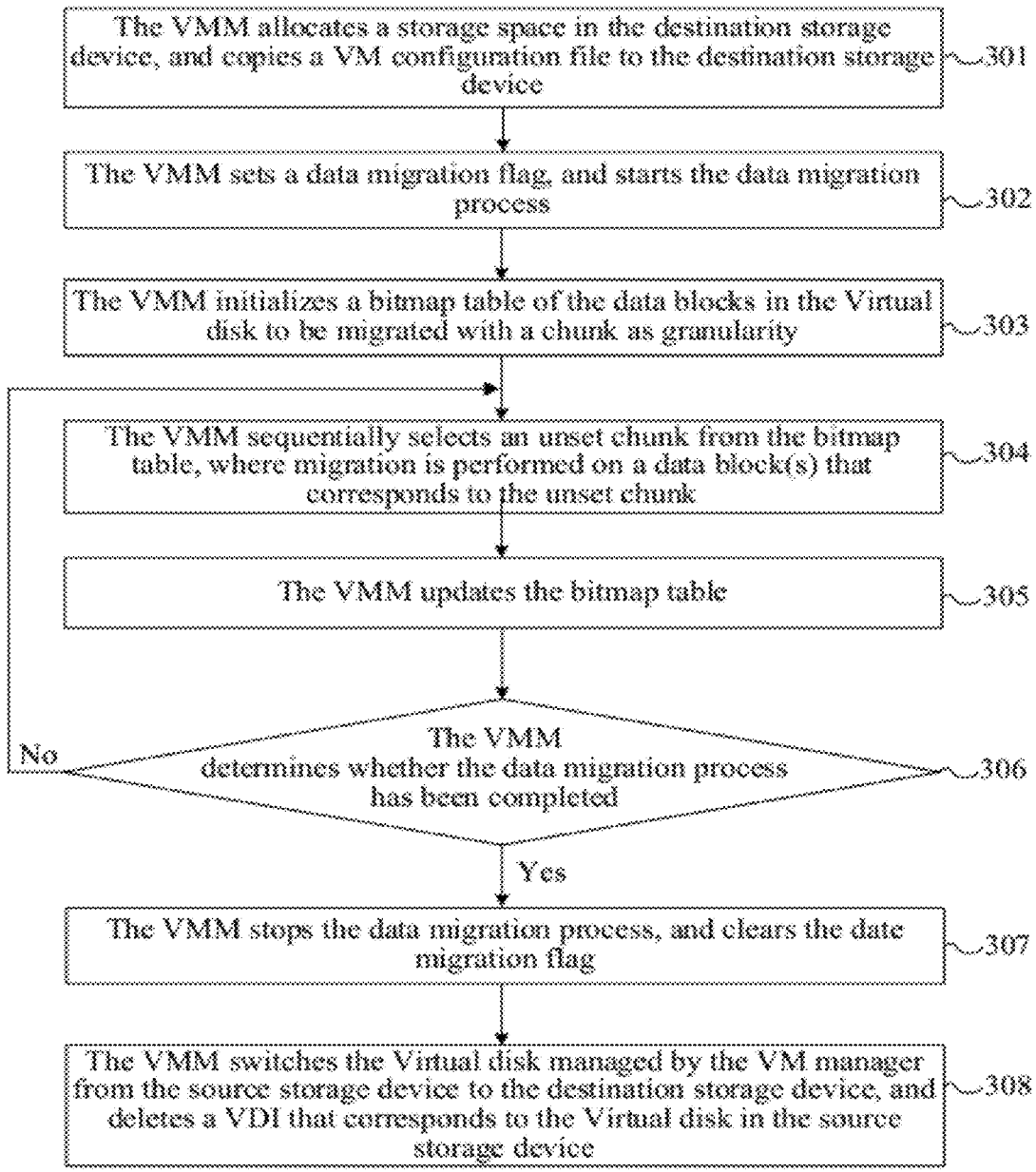
FIG. 3 is a flow chart of a VM data migration process in the virtual storage migration method according to Embodiment 2 of the present invention.

FIG. 3 is a flow chart of a virtual storage migration method according to Embodiment 2 of the present invention. As shown in FIG. 3, this embodiment provides a virtual storage migration method, where the method includes the following steps:

Step 301: The VMM allocates a storage space in a destination storage device, and copies a VM configuration file to the destination storage device.

The source storage device and the destination storage device in this embodiment are set according to the direction of data migration, in which the source storage device is a position where the data is originally stored, the destination storage device is a position where the data is stored after device migration, and the data migration process is a process in which the data is migrated from the source storage device to the destination storage device. Taking FIG. 2 as an example, a storage device lowest left in FIG. 2 is the source storage device, and a storage device lowest right in FIG. 2 is the destination storage device. Before data migration is performed, the VMM first allocates a storage space in the destination storage device for storing the data blocks in the Virtual disk to be migrated and the VM configuration file in the source storage device. During execution of this step, the VMM is first connected to the destination storage device, and establishes a data channel between the source storage device and the destination storage device. Next, the VMM copies the VM configuration file in the source storage device to the destination storage device, so that the source storage device and the destination storage device respectively store a copy of the VM configuration file.

Step 302: The VMM sets a data migration flag, and starts the data migration process.

After the preparation for the data migration process is completed, the VMM sets a data migration flag in the VMM itself, and at the same time starts the data migration process to migrate the data blocks in the VD to be migrated, so as to copy the data blocks from the source storage device to the destination storage device. The data migration flag may be used to identify that the data blocks is during the data migration process currently and the data migration process is in an execution state currently. In this step, the starting, by the VMM, the data migration process may specifically be: when the VM is idle, the VMM restarts the data migration process. In this embodiment, in order to reduce the influences of the virtual storage migration on the I/O performance of the VM front-end application, this embodiment adopts a low-priority data migration process, that is, the VMM preferentially serves the front-end I/O access request of the front-end application of the VM, in which the front-end I/O access request may include an I/O read request and an I/O write request. When the VM is idle, the VMM starts the data migration process, that is, the VMM utilizes idle I/O bandwidth to copy the data in the VD.

Step 303: The VMM initializes a bitmap table of the data blocks in the Virtual disk to be migrated with a chunk as granularity.

In the execution of the data migration process, in this embodiment, a bitmap table of the data blocks in the Virtual disk to be migrated is set to assist the migration process to perform data copy. Specifically, during the data migration in this embodiment, the bitmap table of the data blocks is first initialized, in which the VMM may initialize the bitmap table of the data blocks in the Virtual disk to be migrated with the chunk as the granularity, and the size of the chunk is set according to the size of the Virtual disk to be migrated. In this embodiment, the bitmap table is initialized with the chunk as granularity, in which each bit in the bitmap table corresponds to one chunk to be migrated, and the size of the chunk may be set according to the size of the Virtual disk to be migrated before the data migration begins. Moreover, the read and write performances of the disk can be improved by setting a larger chunk. For example, taking the Virtual disk to be migrated having a size of 100 GB as an example, if each chunk used in the migration process is set to be 1 MB, the size of the corresponding bitmap tale is merely 12.5 KB. Therefore, it may be seen that the bitmap table is used to assist the data migration process in this embodiment, and the bitmap table consumes a very small memory space.

Step 304: The VMM sequentially selects an unset chunk from the bitmap table, where migration is performed on a data block(s) that corresponds to the unset chunk.

In the data migration according to the embodiment of the present invention, a data block that corresponds to an unset chunk is sequentially selected from the bitmap table for migration, in which the unset chunk is used to identify chunks that have not yet finished migration. After each data block has been migrated, the chunk that corresponds to the data block(s) in the bitmap table is set, so as to identify that the data block(s) that corresponds to the chunk has been migrated. Therefore, it may be seen from the bitmap table that the data blocks that correspond to which chunks have been migrated, and the data blocks that correspond to which chunks haven not been migrated, so that an unset chunk may be sequentially selected from the bitmap table in each migration. In the data migration according to this embodiment, the above steps may be executed repeatedly, till all the chunks in the bitmap table have been set, indicating that the data blocks in the Virtual disk to be migrated have been all migrated.

Step 305: The VMM updates the bitmap table.

After the migration of one migration data block is completed, the VMM updates the bitmap table, specifically, the VMM sets the chunk that corresponds to the migration data block in the bitmap table, indicating that the data block that corresponds to the chunk has been migrated.

Step 306: The VMM determines whether the data migration process has been completed, if the data migration process has been completed, the VMM executes step 307, and if the data migration process has not been completed, the processes returns to step 304.

After updating the bitmap table, the VMM determines whether the whole data migration process has been completed, specifically, determines, according to the bitmap table, whether the chunks that correspond to the data blocks in the bitmap table have all been set. If the chunks have all been set, it indicates that the all the data blocks in the Virtual disk to be migrated have been copied to the destination storage device, so step 307 is performed. If a chunk that corresponds to a data block in the bitmap table has not been set yet, the process returns to step 304, and unset data blocks are sequentially migrated till all the data blocks in the Virtual disk to be migrated are copied to the destination storage device.

Step 307: The VMM stops the data migration process, and clears the data migration flag.

After all the data blocks in the Virtual disk to be migrated are copied to the destination storage device, the VMM stops the data migration process started previously, and clears the data migration flag, indicating that the VM is not in a data migration state currently, so subsequently other devices may know, through the data migration flag, that the VM is not in the data migration state currently when accessing the VM or executing other operations.

Step 308: The VMM switches the Virtual disk managed by the VM manager from the source storage device to the destination storage device, and deletes a VDI that corresponds to the Virtual disk in the source storage device.

After completing the whole data migration process, the VMM directly switches the Virtual disk from the source storage device to the destination storage device, deletes the VDI that corresponds to the Virtual disk in the source storage device, and then sends all the read and write requests of the VM to the destination storage device.

Figure 4A:
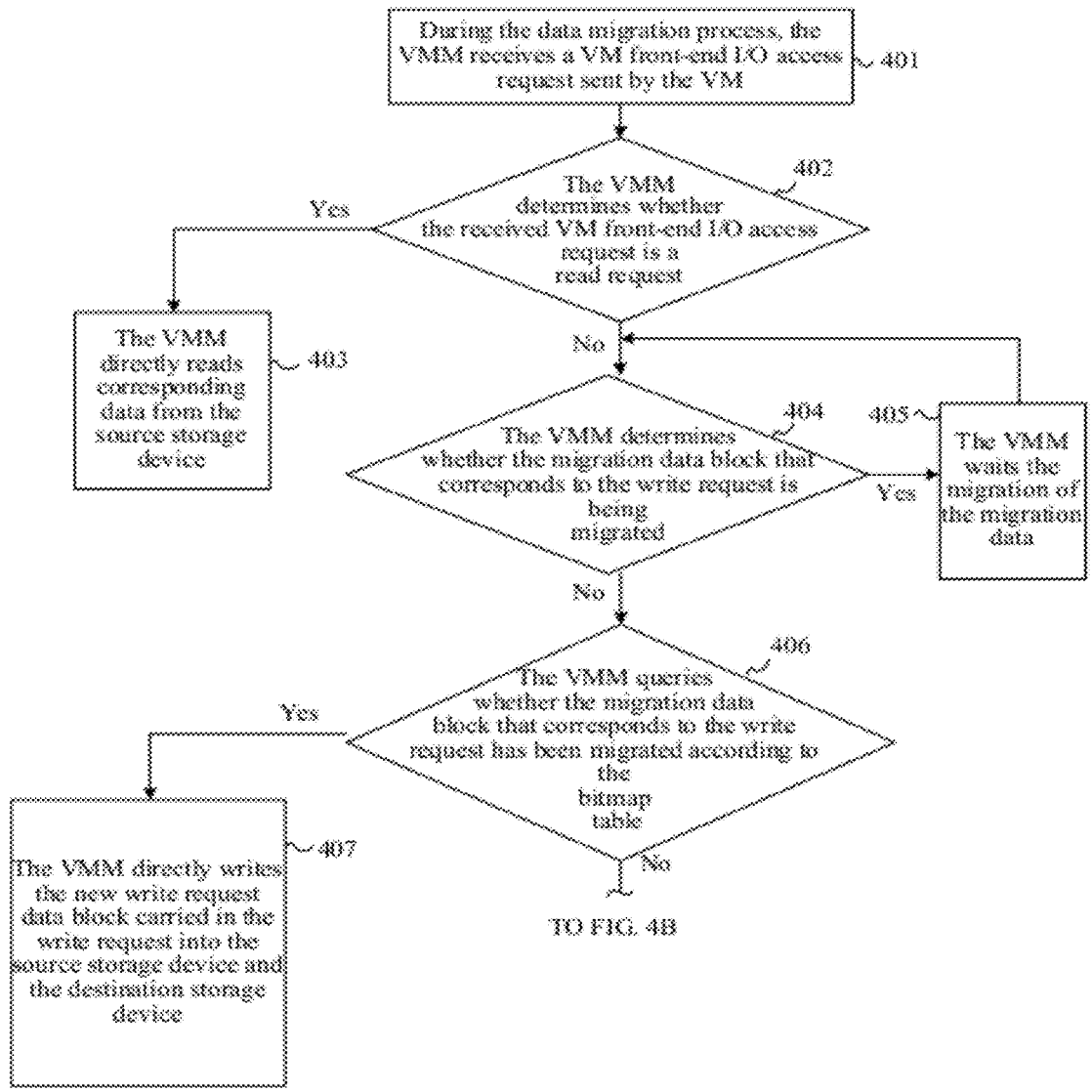
FIG. 4A and FIG. 4B are a flow chart of an I/O processing process in the virtual storage migration method according to Embodiment 2 of the present invention.
Figure 4B:
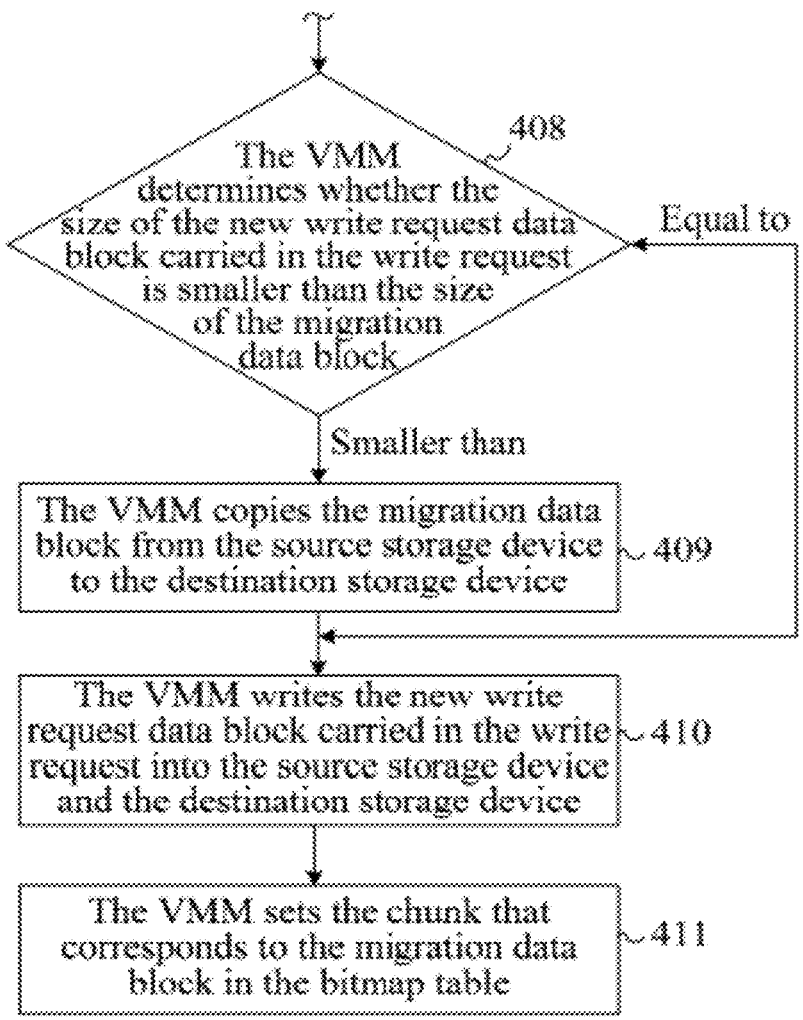

FIG. 4 is a flow chart of a VM I/O processing process in the virtual storage migration method according to Embodiment 2 of the present invention. FIG. 3 only introduces the steps in the VM data migration process in this embodiment and FIG. 4 further specifically explains the steps of the VM I/O processing process in this embodiment. Specifically, on the basis of the steps shown in FIG. 3, the virtual storage migration method according to this embodiment may further include the following steps.

Step 401: During the data migration process, the VMM receives a VM front-end I/O access request sent by the VM.

In this embodiment, after the VMM starts the data migration process, the data migration begins, and during the data migration process, the VMM receives the VM front-end I/O access request sent by the VM, where information of a data block to be accessed by the request, i.e. a data block information is carried in the VM front-end I/O access request. When the front-end I/O access request is a read request, the data block information includes a position or flag information of the data block to be read from the Virtual disk, or when the front-end I/O access request is a write request, the data block information includes a position or flag information of the data block which is required by the write request and is to be written into the Virtual disk. The VM front-end I/O access request may also carry a new write request data block which is required by the write request and is to be written into the Virtual disk, so as to write the new write request data block into a corresponding data block.

Step 402: The VMM determines whether the received VM front-end I/O access request is a read request, and if the received VM front-end I/O access request is a read request, step 403 is executed; if the received VM front-end I/O access request is not a read request, step 404 is executed.

This step includes that the VMM first determines whether the VM front-end I/O access request is a read request, and then executes subsequent different steps according to different request types. If the VM front-end I/O access request received by the VMM is a read request, step 403 is executed to directly read, from the source storage device, data that corresponds to the VM front-end I/O read request, and the procedure is ended. If the VM front-end I/O access request received by the VMM is not a read request but a write request, step 404 is executed to continue to determine the information that corresponds to the write request.

Step 403: The VMM directly reads data that corresponds to the VM front-end I/O read request from the source storage device.

When the VM front-end I/O access request received by the VMM is a read request, the read request is merely to read data from the Virtual disk but not to modify the data in the Virtual disk, and the source storage device always saves all the data in the Virtual disk to be migrated during the data migration process. Therefore, after receiving the read request sent by the VM, the VMM does not need to determine whether the data block that corresponds to the read request has been migrated or is being migrated, but directly reads data that corresponds to the read request from the source storage device, and the procedure is ended. At this time, the execution of the read request and the data migration process are synchronous, and do not affect each other.

Step 404: The VMM determines whether the migration data block that corresponds to the write request is being migrated. If the migration data block that corresponds to the write request is being migrated, step 405 is executed. If the migration data block that corresponds to the write request is not being migrated, step 406 is executed.

Figure 5:
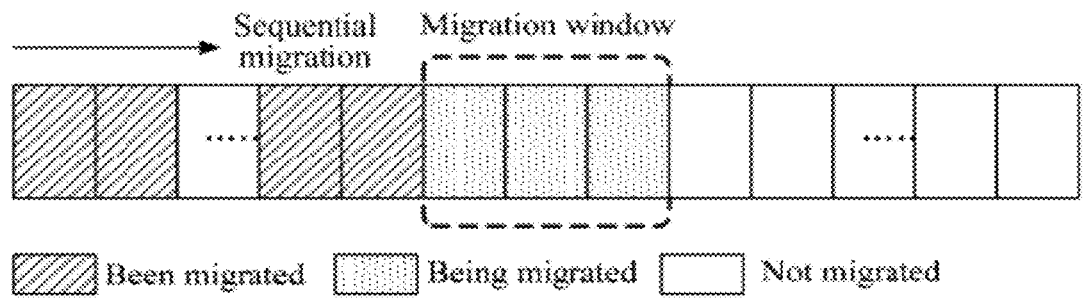
FIG. 5 is a schematic diagram of a data migration window in the virtual storage migration method according to Embodiment 2 of the present invention.

When the VM front-end I/O access request received by the VMM is a write request, as the execution of the write request changes the corresponding data block in the Virtual disk to be migrated, the VMM needs to determine whether the migration data block that corresponds to the write request is being migrated, that is, determine whether the migration data block in the Virtual disk to be migrated which is required by the write request and is to be written is being migrated. In this embodiment, after receiving the write request, the VMM first performs alignment processing on a new write request data block carried in the write request to align the write request data block to each migration data block in the bitmap table, so as to acquire the migration data block that corresponds to the write request through the alignment processing. One or more migration data blocks that correspond to the write request may exist. When the total size of a new write request data block(s) carried in the write request is larger than the size of a unit migration data block, and the write request corresponds to multiple migration data blocks, the write request processes each migration data block. When the size of the total data block of the new write request carried in the write request is larger than the size of the unit migration data block, the write request may correspond to multiple migration data blocks, that is, the write request may correspond to one part of one migration data block, and another part of the other one migration data block which is adjacent to the one migration data block Subsequent embodiments illustrate the write request after the alignment processing, that is, if the write request corresponds to multiple migration data blocks, the total data block of the new write request carried in the write request is divided into blocks to form multiple new write request data blocks. Each new write request data block corresponds to one migration data block. The migration data block is a data block in the Virtual disk to be migrated. Herein the migration data block is a data block which is required by the write request and is to be written. Specifically, FIG. 5 is a schematic diagram of a data migration window in the virtual storage migration method according to Embodiment 2 of the present invention. For the convenience of maintaining the consistency of the data in the Virtual storage online migration process, the chunk in the bitmap table mentioned above is the smallest data unit in each migration process, which may be specifically shown in the migration window in FIG. 5. Taking FIG. 5 as an example, when data migration is performed, the VMM selects a block of unset data in the bitmap table sequentially for migration, and at this time, the migration window falls on the chunk that corresponds to the data block. Herein, one chunk includes data represented by three squares, that is, the migration window falls on the three squares. After the data block has been migrated, the VMM selects a next unset data block in the bitmap table sequentially for migration. As shown in FIG. 5, the migration window may move to the left by three squares repetitively, so the window continuously moves and traverses all the squares in the bitmap table, till all the data blocks in the bitmap table are set.

When it is determined whether the migration data block that corresponds to the write request is being migrated, it may be specifically determined whether the migration data block that corresponds to the write request falls in the current migration window. If the migration data block that corresponds to the write request falls in the current migration window, it indicates that the migration data block is being migrated. For the convenience of implementation, locking processing may be performed on the data block. When the data migration process and the write request process the same data block, a lock of the data block needs to be obtained first, so as to perform mutually exclusive access on the data block. When a data block is first migrated in the data migration process, a lock of the data block is first obtained in the data migration process. When the write request also processes the data block, the write request needs to wait till the migration of the data block is completed in the data migration process, so as to execute the write operation. After determination, when the migration data block that corresponds to the write request is currently being migrated, the VMM executes the subsequent step 405 to execute the write operation that corresponds to the write request after the migration process of the migration data block is completed. When the migration data block that corresponds to the write request is not in a migration state currently, the VMM executes the subsequent step 406 to execute the write operation that corresponds to the write request according to the bitmap table. That is, the VMM further determines the state of the migration data block by querying the bitmap table, and then executes the write operation that corresponds to the write request according to a determination result.

Step 405: The VMM executes the write operation that corresponds to the write request after the migration of the migration data block is completed.

When the migration data block that corresponds to the write request received by the VMM is being migrated, the VMM does not execute the write operation that corresponds to the write request, but wait the migration of the migration data block, and executes the corresponding write operation after the migration of the migration data block is completed, that is, subsequent step 406 is executed.

Step 406: The VMM queries whether the migration data block that corresponds to the write request has been migrated according to the bitmap table. If the migration data block that corresponds to the write request has been migrated, step 407 is executed. If the migration data block that corresponds to the write request has not been migrated, step 408 is executed.

When the migration data block that corresponds to the write request received by the VMM is not in a migration state currently, the VMM queries, according to the preset bitmap table, the state of the migration data block that corresponds to the write request, that is, determines whether the migration data block that corresponds to the write request has been migrated according to the set state of the chunk that corresponds to the migration data block in the bitmap table. If the chunk that corresponds to the migration data block in the bitmap table has been set, it indicates that the migration data block that corresponds to the write request has been migrated, so step 407 is executed that the VMM directly writes a new write request data block carried in the write request into the source storage device and the destination storage device. If the chunk that corresponds to the migration data block in the bitmap table is unset, it indicates that the migration data block that corresponds to the write request has not been migrated (in fact, as it may be obtained that the data block is also not in the state of "being migrated" through step 404, the actual state of the data block is that the data block does not begin to be migrated), step 408 is executed that the state of the data block is further determined.

Step 407: The VMM directly writes the new write request data block carried in the write request into the source storage device and the destination storage device, and returns to execute the data migration process.

When the migration data block that corresponds to the write request has been migrated, and the migration data block has been stored in the source storage device and the destination storage device, the VMM directly writes the new write request data block carried in the write request into the source storage device and the destination storage device when executing the write operation that corresponds to the write request. Herein, the new write request data block is the data which is required by the write request and is to be written into the corresponding migration data block, that is, the new write request data block is the data to be updated to the migration data block. After executing the write operation in this step, the VMM returns to execute the data migration process.

Step 408: The VMM determines whether the size of the new write request data block carried in the write request is smaller than the size of the migration data block. If the size of the new write request data block carried in the write request is smaller than the size of the migration data block, step 409 is executed. If the size of the new write request data block carried in the write request is not smaller than the size of the migration data block, step 410 is executed.

When the migration data block that corresponds to the write request does not begin to be migrated, the VMM further compares the size of the new write request data block carried in the write request and the size of the corresponding migration data block, that is, determines whether the write operation that corresponds to the write request is executed in a full block of the migration data block. When the size of the new write request data block is smaller than the size of the migration data block, the VMM executes subsequent step 409 to first copy the migration data block from the source storage device to the destination storage device. When the size of the new write request data block is just equal to the size of the migration data block, the VMM executes subsequent step 410 to directly write the new write request data block carried in the write request into the source storage device and the destination storage device.

Step 409: The VMM copies the migration data block from the source storage device to the destination storage device, and continues to execute step 410.

When the size of the new write request data block is smaller than the size of the migration data block, that is, the write operation that corresponds to the write request merely corresponds to a part of data in the migration data block, the VMM needs to first copy the migration data block from the source storage device to the destination storage device, thereby implementing backup of the migration data block at the source storage device and the destination storage device, so as to complete the migration of the migration data block; and then subsequent step 410 is executed.

Step 410: The VMM writes the new write request data block carried in the write request into the source storage device and the destination storage device, and executes subsequent step 411.

When the write operation that corresponds to the write request merely corresponds to a part of the data in the corresponding migration data block, the VMM first copies the migration data block, then executes step 410 to write the new write request data block into the source storage device and the destination storage device, thereby implementing migration of the migration data block and execution of the write operation. When the write operation that corresponds to the write request corresponds to a full block of the migration data block, the VMM directly writes the new write request data block into the source storage device and the destination storage device, thereby implementing migration of the migration data block and execution of the write operation. At this time, the execution of the write operation is completed, and both the source storage device and the destination storage device save the updated migration data block without updating the data after the whole data migration process is ended.

Step 411: The VMM sets the chunk that corresponds to the migration data block in the bitmap table.

After the migration of one migration data block is completed, the VMM sets the chunk that corresponds to the migration data block in the bitmap table, indicating that the data block that corresponds to the chunk has been migrated.

This embodiment provides a virtual storage migration method. The VMM starts the data migration process. During the data migration process, the VMM redirects the received VM front-end I/O access request according to the current data migration situation, and after the Virtual disk is migrated from the source storage device to the destination storage device, the VMM switches the Storage device which is used by the VM from the source storage device to the destination storage device, in which the whole process is transparent to the upper layer OS and applications of the VM. Moreover, as the VM front-end I/O access request is processed simultaneously during the data migration, no additional child disk is required to record data changed in each request, and no VM suspension is required to separately perform update processing on the changed data. Therefore, in this embodiment, service interruption or even an error caused by VM suspension is avoided, and the high availability requirement of "zero suspension" in critical application scenarios such as telecommunications and banks is satisfied. Furthermore, in this embodiment, as no cyclic iteration copy is required for the changed part of the data blocks, in the Virtual disk migration process, each data block is transferred once at most. Compared with the storage online migration post-copy method, a migration data volume is greatly reduced, and migration time is shortened, and thereby the access performance of the VM is improved, so that it is especially suitable for the scenario of intensive write requests. Moreover, during the data migration process in this embodiment, no additional storage space is required to record the changed data, and the storage of the data stored in the source storage device does not need to be changed, so that the read and write of the VM are not influenced, and the VM still has good read and write performance during the data migration process. Finally, this embodiment adopts a low-priority data migration process, the VMM preferentially serves the normal I/O access of the VM, and meanwhile, performs data transmission by using idle I/O bandwidth, and thereby no influence on the normal service of the VM is caused.

According to a remote data copy or synchronization method in a conventional block-level storage system, the data transmission is performed with the whole storage device as a unit. However, in the VM environment, the storage device generally includes multiple Virtual disk images, and the storage device may not sense and distinguish the Virtual disks, so a Virtual disk may not be separately migrated. Compared with the prior art, as in this embodiment, the bitmap table of the data block in the Virtual disk to be migrated is initialized with the chunk as granularity and the bitmap table is used to assist the data migration process, the consumption of a memory space is significantly reduced.

Those skilled in the art should understand that all or a part of the steps of the method according to the embodiments of the present invention may be implemented by a program instructing relevant hardware. The program may be stored in a computer readable storage medium. When the program is executed, the steps of the method according to the embodiments of the present invention are executed. The storage medium may be any medium that is capable of storing program codes, such as a Read Only Memory (ROM), a Random Access Memory (RAM), a magnetic disk or an optical disk.

Figure 6:
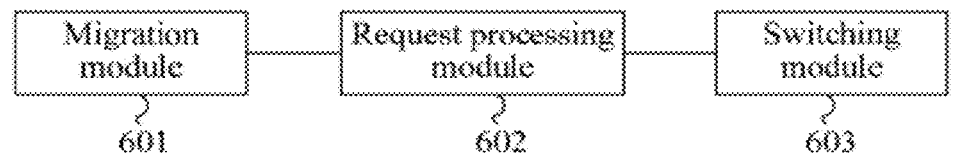
FIG. 6 is a schematic structural diagram of a VMM according to Embodiment 1 of the present invention.

FIG. 6 is a schematic structural diagram of a VMM according to Embodiment 1 of the present invention. As shown in FIG. 6, this embodiment provides a VMM capable of specifically executing the steps in the method in Embodiment 1, which is not described here again. The VMM according to this embodiment may specifically include a migration module 601, a request processing module 602 and a switch module 603. The migration module 601 is configured to start data migration process, and copy, from a source storage device to a destination storage device, data blocks in a Virtual disk to be migrated. The request processing module 602 is configured to directly read, from the source storage device, data that corresponds to a VM I/O read request when the VM I/O read request is received during the data migration process; and determine whether a migration data block that corresponds to the VM front-end I/O write request is being migrated when a VM front-end I/O write request is received, and if the migration data block that corresponds to the VM front-end I/O write request is being migrated, execute a write operation that corresponds to the VM front-end I/O write request after the migration of the migration data block is completed; if the migration data block that corresponds to the VM front-end I/O write request is not being migrated, execute the write operation that corresponds to the VM front-end I/O write request. The switch module 603 is configured to stop the data migration after all data blocks in the Virtual disk to be migrated are copied to the destination storage device, and switch the Virtual disk managed by a VM manager from the source storage device to the destination storage device.

Figure 7:
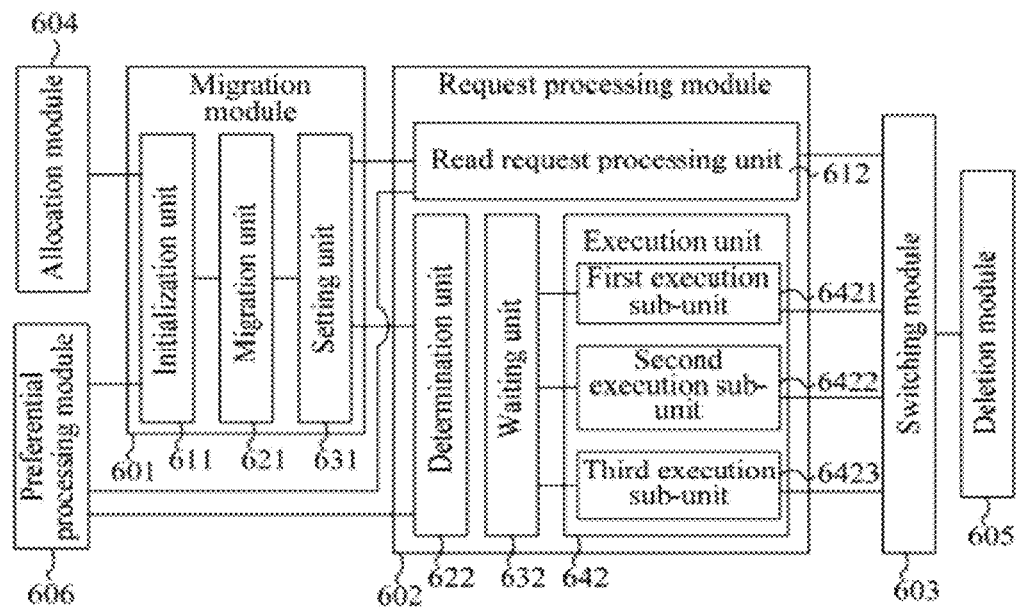
FIG. 7 is a schematic structural diagram of a VMM according to Embodiment 2 of the present invention.

FIG. 7 is a schematic structural diagram of a VMM according to Embodiment 2 of the present invention. As shown in FIG. 7, this embodiment provides a VMM capable of specifically executing the steps in the method in Embodiment 1, which is not described here again. On the basis of the VMM shown in FIG. 6, the migration module 601 in the VMM according to this embodiment may specifically include an initialization unit 611, a migration unit 621 and a setting unit 631. The initialization unit 611 is configured to initialize the bitmap table of the data block in the Virtual disk to be migrated with a chunk as granularity, in which the size of the chunk is set according to the size of the Virtual disk to be migrated. The migration unit 621 is configured to sequentially select a data block that corresponds to an unset chunk from the bitmap table for migration. The setting unit 631 is configured to set the chunk in the bitmap table when the data block that corresponds to the chunk is copied from the source storage device to the destination storage device.

Specifically, the request processing module 602 may specifically include a read request processing unit 612, a determination unit 622, a waiting unit 632 and an execution unit 642. The read request processing unit 612 is configured to directly read, from the source storage device, data that corresponds to the received VM front-end I/O access request, when the received VM front-end I/O access request is a read request during the data migration. The determination unit 622 is configured to determine whether the migration data block that corresponds to the VM front-end I/O write request is being migrated when a VM front-end write request is received during the data migration process. The waiting unit 632 is configured to execute a write operation that corresponds to the VM front-end I/O write request after the migration of the data block is completed when a determination result of the determination unit 622 is that the migration data block that corresponds to the VM front-end I/O write request is being migrated. The execution unit 642 is configured to execute the write operation that corresponds to the VM front-end I/O write request according to the bitmap table when the determination result of the determination unit 622 is that the migration data block that corresponds to the VM front-end I/O write request is not being migrated.

Furthermore, the execution unit 642 may specifically include a first execution sub-unit 6421, a second execution sub-unit 6422 and a third execution sub-unit 6423. The first execution sub-unit 6421 is configured to directly write a new write request data block carried in the VM front-end I/O write request into the source storage device and the destination storage device when it is queried according to the bitmap table that the migration data block that corresponds to the VM front-end I/O write request has been migrated. The second execution sub-unit 6422 is configured to copy the migration data block from the source storage device to the destination storage device, write the new write request data block into the source storage device and the destination storage device, and set the chunk that corresponds to the migration data block in the bitmap table, when it is queried according to the bitmap table that the migration data block that corresponds to the VM front-end I/O write request is not migrated and the size of the new write request data block carried in the VM front-end I/O write request is smaller than the size of the migration data block. The third execution sub-unit 6423 is configured to directly write the new write request data block into the source storage device and the destination storage device and set the chunk that corresponds to the migration data block in the bitmap table, when it is queried according to the bitmap table that the migration data block that corresponds to the VM front-end I/O write request is not migrated and the size of the new write request data block carried in the VM front-end I/O write request is equal to the size of the migration data block.

Furthermore, the VMM according to this embodiment may include an allocation module 604. The allocation module 604 is configured to allocate a storage space in the destination storage device before the data migration process is started, copy a VM configuration file to the destination storage device, and set a data migration flag, in which the data migration flag is used to identify that the data is currently being migrated.

Furthermore, the VMM according to this embodiment may include a deletion module 605. The deletion module 605 is configured to clear the data migration flag after the data migration process is stopped, and delete the Virtual disk image that corresponds to the Virtual disk in the source storage device.

Furthermore, the VMM according to this embodiment may include a preferential processing module 606. The preferential processing module 606 is configured to preferentially process the I/O access request, in which the I/O access request includes the VM front-end I/O read request and the VM front-end I/O write request; and perform data migration by adopting a low-priority data migration thread when the VM is idle.

This embodiment provides a VMM. The VMM starts a data migration process, copies, from the source storage device to the destination storage device, the data blocks in the Virtual disk to be migrated; during the data migration process, performs corresponding processing on the received VM front-end I/O access request according to the current data migration situation, that is, when a VM front-end I/O read request is received, the VMM directly reads data that corresponds to the VM front-end I/O read request, and when a VM front-end I/O write request is received, first determines whether a migration data block that corresponds to the write request is being migrated, and if the migration data block that corresponds to the write request is being migrated, executes the write operation after the migration is completed, if the migration data block that corresponds to the write request is not being migrated, directly executes the write operation; and after the Virtual disk is copied from the source storage device to the destination storage device, switches the Storage device which is used by the VM from the source storage device to the destination storage device, in which the whole process is transparent to the upper layer OS and applications of the VM. Moreover, as the VM front-end I/O access request is processed simultaneously during the data migration process, no additional child disk is required to record data changed in each request, and no VM suspension is required to separately perform update processing on the changed data. Therefore, in this embodiment, service interruption or even an error caused by VM suspension is avoided. Furthermore, compared with the storage online migration post-copy method in the prior art, as no cyclic iteration copy is required for the changed part of the data blocks, a migration data volume is greatly reduced, and migration time is shortened, and thereby the access performance of the VM is improved.

This embodiment provides a virtual storage migration system, where the virtual storage migration system includes at least one VM, a source storage device, a destination storage device and a VMM. The VMM may be the VMM shown in FIG. 6 or FIG. 7.

Finally, it should be noted that the foregoing embodiments are provided for describing the technical solutions of the present invention, but not intended to limit the present invention. It should be understood by persons skilled in the art that although the present invention has been described in detail with reference to the foregoing embodiments, modifications may be made to the technical solutions described in the foregoing embodiments, or equivalent replacements may be made to some technical features in the technical solutions, as long as such modifications or replacements do not cause the essence of corresponding technical solutions to depart from the spirit and protection scope of the present invention.

What is claimed is:

1. A data migration method for virtual storage migration, comprising:

copying, from a source storage device to a destination storage device, a data block in a virtual disk to be migrated;

when a virtual machine front-end input/output (I/O) read request is received, directly reading, from the source storage device, data that corresponds to the virtual machine front-end input/output (I/O) read request; and when a virtual machine front-end I/O write request is received, determining whether a migration data block that corresponds to the virtual machine front-end I/O write request is being migrated, and when the migration data block that corresponds to the virtual machine front-end I/O write request is being migrated, executing a write operation that corresponds to the virtual machine front-end I/O write request after the migration of the migration data block is completed; when the migration data block that corresponds to the virtual machine front-end I/O write request is not being migrated, directly executing the write operation that corresponds to the virtual machine front-end I/O write request;

wherein when the migration data block that corresponds to the virtual machine front-end I/O write request is not being migrated, directly executing the write operation that corresponds to the virtual machine front-end I/O write request comprises:

when queried according to a bitmap table that the migration data block that corresponds to the virtual machine front-end I/O write request is not migrated and the size of the new write request data block carried in the virtual machine front-end I/O write request is equal to the size of the migration data block, directly writing the new write request data block into the source storage device and the destination storage device and setting the chunk that corresponds to the migration data block in the bitmap table to represent that the data block that corresponds to the chunk has been migrated, and after all data blocks in the virtual disk to be migrated are copied to the destination storage device, stopping the data migration process, and switching the virtual disk managed by a virtual machine manager from the source storage device to the destination storage device.

2. The method according to claim 1, wherein the starting the data migration process and copying, from the source storage device to the destination storage device, the data block in the virtual disk to be migrated comprises:

initializing, with a chunk as granularity, a bitmap table of the data block in the virtual disk to be migrated, wherein a size of the chunk is set according to a size of the virtual disk to be migrated;

sequentially selecting the data block that corresponds to an unset chunk from the bitmap table for migration; and setting the unset chunk in the bitmap table to represent that the data block that corresponds to the chunk has been migrated when the data block that corresponds to the unset chunk is copied from the source storage device to the destination storage device.

3. The method according to claim 2, wherein, when the virtual machine front-end I/O write request is received and determined that the migration data block that corresponds to the virtual machine front-end I/O write request is not being migrated, the step of directly executing the write operation that corresponds to the virtual machine front-end I/O write request further comprises:

directly writing the new write request data block carried in the virtual machine front-end I/O write request into the source storage device and the destination storage device when queried according to the bitmap table that the migration data block that corresponds to the virtual machine front-end I/O write request has been migrated;

copying the migration data block from the source storage device to the destination storage device, writing the new write request data block into the source storage device and the destination storage device, and setting the chunk that corresponds to the migration data block in the bitmap table, when it is queried according to the bitmap table that the migration data block that corresponds to the virtual machine front-end I/O write request is not migrated and the size of the new write request data block carried in the virtual machine front-end I/O write request is smaller than the size of the migration data block.

4. The method according to claim 1, before starting the data migration process, further comprising:

allocating a storage space in the destination storage device, and copying a virtual machine configuration file to the destination storage device, and setting a data migration flag, wherein the data migration flag is used to identify that data in the virtual disk to be migrated is currently being migrated.

5. The method according to claim 4, after the starting the data migration process, further comprising:

clearing the data migration flag, and deleting a virtual disk image that corresponds to the virtual disk in the source storage device.

6. The method according to claim 1, further comprising:

preferentially processing a virtual machine front-end I/O access request, wherein the front-end I/O access request comprises the virtual machine front-end I/O read request and the virtual machine front-end I/O write request; and performing data migration by adopting a low-priority data migration thread when the virtual machine is idle.

7. A virtual machine monitor, comprising:

a processor and a memory;

wherein the memory is configured to store computer executable instructions, and the processor is configured to execute the computer executable instructions stored in the memory;

wherein the computer executable instructions are configured to instruct the processor to: implement a data migration process, comprising:

copy, from a source storage device to a destination storage device, a data block in a virtual disk to be migrated;

directly read, from the source storage device, data that corresponds to a virtual machine (VM) front-end input/output (I/O) read request when the virtual machine front-end input/output (I/O) read request is received; and determine whether a migration data block that corresponds to a virtual machine front-end I/O write request is being migrated when the VM front-end I/O write request is received, and when the migration data block that corresponds to the virtual machine front-end I/O write request is being migrated, execute a write operation that corresponds to the virtual machine front-end I/O write request after the migration of the migration data block is completed; when the migration data block that corresponds to the virtual machine front-end I/O write request is not being migrated, directly execute the write operation that corresponds to the virtual machine front-end I/O write request; and wherein the instructions being configured to instruct the processor to, when the migration data block that corresponds to the virtual machine front-end I/O write request is not being migrated, directly execute the write operation that corresponds to the virtual machine front-end I/O write request comprises:

when queried according to a bitmap table that the migration data block that corresponds to the virtual machine front-end I/O write request is not migrated and the size of the new write request data block carried in the virtual machine front-end I/O write request is equal to the size of the migration data block, the instructions being configured to instruct the processor to directly write the new write request data block into the source storage device and the destination storage device and set the chunk that corresponds to the migration data block in the bitmap table to represent that the migration data block that corresponds to the chunk has been migrated;

stop the data migration process after all data blocks in the virtual disk to be migrated are copied to the destination storage device, and switch the virtual disk managed by a virtual machine manager from the source storage device to the destination storage device.

8. The virtual machine monitor according to claim 7, wherein the instructions are further configured to instruct the processor to:

initialize, with a chunk as granularity, a bitmap table of a data block in the virtual disk to be migrated, wherein a size of the chunk is set according to a size of the virtual disk to be migrated;

sequentially select a data block that corresponds to an unset chunk from the bitmap table for migration; and set the unset chunk in the bitmap table to represent that the data block that corresponds to the chunk has been migrated when the data block that corresponds to the unset chunk is copied from the source storage device to the destination storage device.

9. The virtual machine monitor according to claim 8, wherein the instructions are further configured to instruct the processor to:

during the data migration process, directly read, from the source storage device, data that corresponds to a virtual machine front-end I/O read request when the virtual machine front-end I/O read request is received;

during the data migration process, determine whether the migration data block that corresponds to a virtual machine front-end I/O write request is being migrated when the virtual machine front-end I/O write request is received;

execute a write operation that corresponds to the virtual machine front-end I/O write request after the migration of the data block is completed when a determination result of the determination unit represents that the migration data block that corresponds to the virtual machine front-end I/O write request is being migrated; and execute the write operation that corresponds to the virtual machine front-end I/O write request according to the bitmap table when the determination result represents that the migration data block that corresponds to the virtual machine front-end I/O write request is not being migrated;

wherein, the instructions being configured to instruct the processor to, when the migration data block that corresponds to the virtual machine front-end I/O write request is not being migrated, directly execute the write operation that corresponds to the virtual machine front-end I/O write request comprises:

the instructions being configured to instruct the processor to directly write the new write request data block carried in the virtual machine front-end I/O write request into the source storage device and the destination storage device when queried according to the bitmap table that the migration data block that corresponds to the virtual machine front-end I/O write request has been migrated;

the instructions being configured to copy the migration data block from the source storage device to the destination storage device, write the new write request data block into the source storage device and the destination storage device, and set the chunk that corresponds to the migration data block in the bitmap table to represent that the migration data block that corresponds to the chunk has been migrated, when it is queried according to the bitmap table that the migration data block that corresponds to the virtual machine front-end I/O write request is not migrated and the size of the new write request data block carried in the virtual machine front-end I/O write request is smaller than the size of the migration data block.

10. The virtual machine monitor according to claim 7, the instructions are further configured to instruct the processor to:
allocate a storage space in the destination storage device before a data migration thread is started, and copy a virtual machine configuration file to the destination storage device, and set a data migration flag, wherein the data migration flag is used to identify that data is currently being migrated.

11. The virtual machine monitor according to claim 10, the instructions are further configured to instruct the processor to:
clear the data migration flag and delete a virtual disk image that corresponds to the virtual disk in the source storage device, after the data migration is stopped.

12. The virtual machine monitor according to claim 7, the instructions are further configured to instruct the processor to:
preferentially process a virtual machine front-end I/O access request, wherein the I/O access request comprises the virtual machine front-end I/O read request and the virtual machine front-end I/O write request; and performing data migration by adopting a low-priority data migration thread when the virtual machine is idle.

13. A virtual storage migration system, comprising at least one virtual machine, a source storage device, a destination storage device and a virtual machine monitor, wherein the virtual machine monitor is configured to:
start a data migration process, comprising:
copying, from the source storage device to the destination storage device, a data block in a virtual disk to be migrated;
when a virtual machine front-end input/output (I/O) read request is received, directly reading, from the source storage device, data that corresponds to the virtual machine front-end input/output (I/O) read request; and
when a virtual machine front-end I/O write request is received, determine whether a migration data block that corresponds to the virtual machine front-end I/O write request is being migrated, and when the migration data block that corresponds to the virtual machine front-end I/O write request is being migrated, execute a write operation that corresponds to the virtual machine front-end I/O write request after the migration of the migration data block is completed; when the migration data block that corresponds to the virtual machine front-end I/O write request is not being migrated, execute the write operation that corresponds to the virtual machine front-end I/O write request; and wherein when the migration data block that corresponds to the virtual machine front-end I/O write request is not being migrated, directly executing the write operation that corresponds to the virtual machine front-end I/O write request comprises:
when queried according to a bitmap table that the migration data block that corresponds to the virtual machine front-end I/O write request is not migrated and the size of the new write request data block carried in the virtual machine front-end I/O write request is equal to the size of the migration data block, directly writing the new write request data block into the source storage device and the destination storage device and setting the chunk that corresponds to the migration data block in the bitmap table to represent that the data block that corresponds to the chunk has been migrated;
after all data blocks in the virtual disk to be migrated are copied to the destination storage device, stop the data migration process, and switch the virtual disk managed by a virtual machine manager from the source storage device to the destination storage device.

14. The system according to claim 13, wherein the virtual machine monitor is further configured to:
allocate a storage space in the destination storage device, and copy a virtual machine configuration file to the destination storage device, and setting a data migration flag, wherein the data migration flag is used to identify that data in the virtual disk to be migrated is currently being migrated.

15. The system according to claim 14, wherein the virtual machine monitor is further configured to:
clear the data migration flag, and delete a virtual disk image that corresponds to the virtual disk in the source storage device.

16. The system according to claim 13, wherein the virtual machine monitor is further configured to:
preferentially process a virtual machine front-end I/O access request, wherein the front-end I/O access request comprises the virtual machine front-end I/O read request and the virtual machine front-end I/O write request; and perform data migration by adopting a low-priority data migration thread when the virtual machine is idle.

17. A non-transitory computer-readable storage medium having computer executable instructions for performing a data migration method for virtual storage migration, comprising:

copying, from a source storage device to a destination storage device, a data block in a virtual disk to be migrated;

when a virtual machine front-end input/output (I/O) read request is received, directly reading, from the source storage device, data that corresponds to the virtual machine front-end input/output (I/O) read request; and when a virtual machine front-end I/O write request is received, determining whether a migration data block that corresponds to the virtual machine front-end I/O write request is being migrated, and when the migration data block that corresponds to the virtual machine front-end I/O write request is being migrated, executing a write operation that corresponds to the virtual machine front-end I/O write request after the migration of the migration data block is completed; when the migration data block that corresponds to the virtual machine front-end I/O write request is not being migrated, directly executing the write operation that corresponds to the virtual machine front-end I/O write request; and wherein when the migration data block that corresponds to the virtual machine front-end I/O write request is not being migrated, directly executing the write operation that corresponds to the virtual machine front-end I/O write request comprises:

when queried according to a bitmap table that the migration data block that corresponds to the virtual machine front-end I/O write request is not migrated and the size of the new write request data block carried in the virtual machine front-end I/O write request is equal to the size of the migration data block, directly writing the new write request data block into the source storage device and the destination storage device and setting the chunk that corresponds to the migration data block in the bitmap table to represent that the data block that corresponds to the chunk has been migrated;

after all data blocks in the virtual disk to be migrated are copied to the destination storage device, stopping the data migration process, and switching the virtual disk managed by a virtual machine manager from the source storage device to the destination storage device.

* * * * *